United States Patent [19]

Field

[11] Patent Number: 4,650,949
[45] Date of Patent: Mar. 17, 1987

[54] ELECTRODE FOR ELECTRICAL DISCHARGE MACHINING FILM COOLING PASSAGES IN AN AIRFOIL

[75] Inventor: Robert E. Field, Tequesta, Fla.

[73] Assignee: United Technologies Corporation, Hartford, Conn.

[21] Appl. No.: 812,096

[22] Filed: Dec. 23, 1985

[51] Int. Cl.⁴ .......................... B23H 1/04; B23H 9/10
[52] U.S. Cl. .................... 219/69 E; 416/90 R
[58] Field of Search .......... 219/69 E, 69 M; 416/90 R, 90 A; 29/156.8 H; 204/224 M, 280

[56] References Cited

U.S. PATENT DOCUMENTS

| | | | |
|---|---|---|---|
| B 534,314 | 2/1976 | Andrews | 219/69 E |
| 2,902,584 | 9/1959 | Ullmann | 219/69 E |
| 2,972,182 | 2/1961 | Kent | 29/156.8 H |
| 3,056,014 | 9/1962 | Hulley et al. | 29/156.8 H |
| 3,098,148 | 7/1963 | Piot et al. | 219/69 E |
| 3,156,808 | 11/1964 | Davies et al. | 204/224 M |
| 3,316,626 | 5/1967 | Fredericks | 29/156.8 H |
| 3,527,543 | 9/1970 | Howald | 416/90 |
| 3,536,603 | 10/1970 | Bonga | 204/224 M |
| 3,594,536 | 7/1971 | Holroyd | 219/69 M |
| 3,746,827 | 7/1973 | Martin et al. | 219/69 E |
| 3,803,009 | 4/1974 | Kawafune et al. | 204/224 M |
| 3,963,894 | 6/1976 | Wachtell et al. | 219/69 E |
| 4,096,371 | 6/1978 | Lozon | 219/69 E |
| 4,197,443 | 4/1980 | Sidenstick | 219/69 E |
| 4,217,190 | 8/1980 | Neal et al. | 204/224 M |
| 4,256,555 | 3/1981 | Wilson et al. | 204/224 M |
| 4,415,310 | 11/1983 | Bouiller et al. | 416/90 R |

FOREIGN PATENT DOCUMENTS

| | | | |
|---|---|---|---|
| 733484 | 5/1966 | Canada | 204/224 M |
| 814202 | 6/1959 | United Kingdom | 219/69 E |

Primary Examiner—A. D. Pellinen
Assistant Examiner—Geoffrey S. Evans
Attorney, Agent, or Firm—Stephen E. Revis

[57] ABSTRACT

A sheet metal electrode for forming a shaped, diffusing film coolant passage has a straight, longitudinally extending forward section forming an acute angle with a flat middle section, which, in turn, extends from a rear section which is the base of the electrode. The middle section includes a pair of edges rearwardly diverging from the longitudinal direction and from which extend side walls substantially perpendicular to the middle section. Longitudinally extending edges of the side walls are in the same plane as a lower, flat surface of the forward section such that the surface of the passage formed by such lower surface of the forward section is in the same plane as a surface of the diffusing portion of the passage which is formed by the longitudinally extending edges of the side walls.

6 Claims, 16 Drawing Figures

FIG. I
PRIOR ART
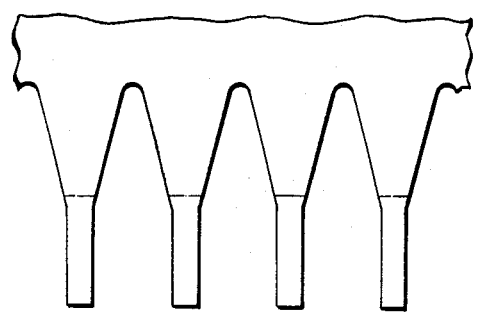
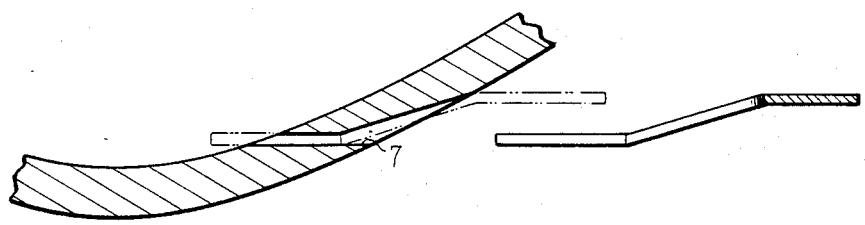
FIG. 2a
PRIOR ART
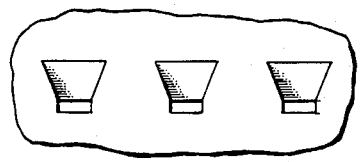
FIG. 2b
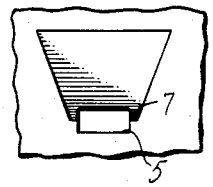

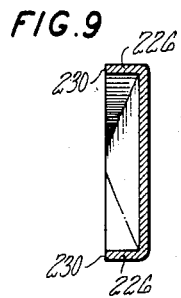
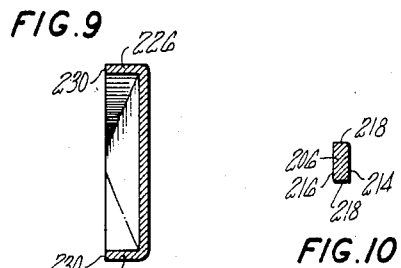
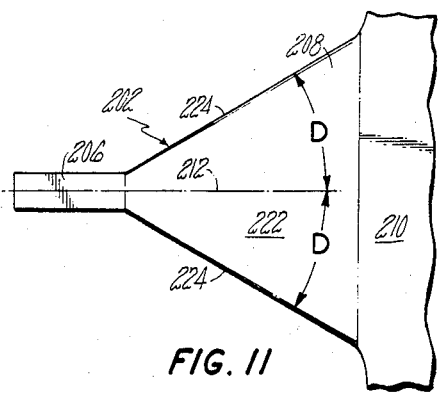
FIG. 9  FIG. 10  FIG. 11
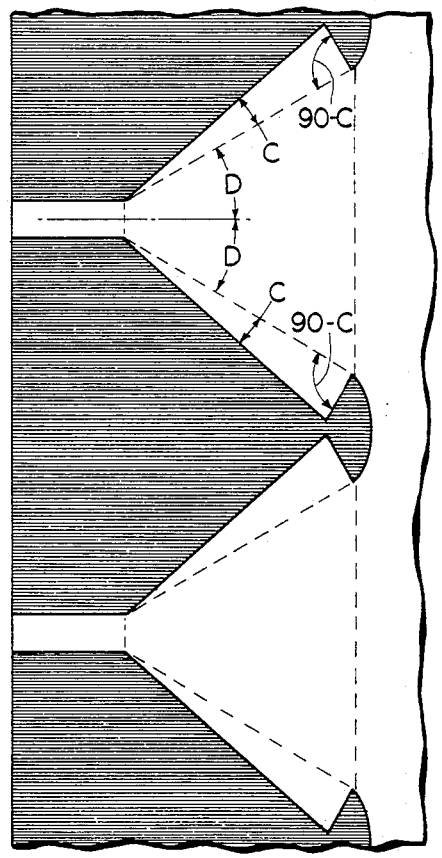
FIG. 12
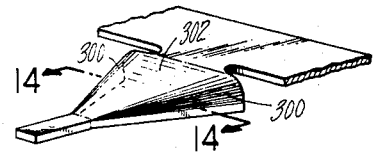
FIG. 13
FIG. 14

ELECTRODE FOR ELECTRICAL DISCHARGE MACHINING FILM COOLING PASSAGES IN AN AIRFOIL

The Government has rights in this invention pursuant to contract No. N00140-83-C-8897 awarded by the Department of the Navy.

DESCRIPTION

1. Technical Field

This invention relates to electrodes for electro-discharge machining.

2. Background Art

It is well known the external surface of airfoils may be cooled by conducting cooling air from an internal cavity to the external surface via a plurality of small passages. It is desired that the air exiting the passages remain entrained in the boundary layer on the surface of the airfoil for as long a distance as possible downstream of the passage to provide a protective film of cool air between the hot mainstream gas and the airfoil surface. The angle which the axis of the passage makes with the airfoil surface and its relation to the direction of hot gas flow over the airfoil surface at the passage breakout are important factors which influence film cooling effectiveness. Film cooling effectiveness E is defined as the difference between the temperature of the main gas stream ($T_g$) and the temperature of the coolant film ($T_f$) at a distance x downstream of the passage outlet, divided by the temperature difference between the temperature of the main gas stream and the coolant temperature ($T_c$) at the passage outlet (i.e., at x=0) thus, $E=(T_g-T_f)/(T_g-T_c)$. Film cooling effectiveness decreases rapidly with distance x from the passage outlet. Maintaining high film cooling effectiveness for as long a distance as possible over as large a surface area as possible is the main goal of airfoil film cooling.

It is well known in the art, that the engine airfoils must be cooled using a minimum amount of cooling air, since the cooling air is working fluid which has been extracted from the compressor and its loss from the gas flow path rapidly reduces engine efficiency. Airfoil designers are faced with the problem of cooling all the engine airfoils using a specified, maximum cooling fluid flow rate. The amount of fluid which flows through each individual cooling passage from an internal cavity into the gas path is controlled by the minimum cross-sectional area (metering area) of the cooling passage. The metering area is typically located where the passage intersects the internal cavity. The total of the metering areas for all the cooling passages and orifices leading from the airfoil controls the total flow rate of coolant from the airfoil, assuming internal and external pressures are fixed or at least beyond the designer's control. The designer has the job of specifying the passage size and the spacing between passages, as well as the shape and orientation of the passages, such that all areas of the airfoil are maintained below critical design temperature limits determined by the airfoil material capability, maximum stress, and life requirement considerations.

Ideally, it is desired to bathe 100% of the airfoil surface with a film of cooling air; however, the air leaving the passage exit generally forms a cooling film stripe no wider than or hardly wider than the dimension of the passage exit perpendicular to the gas flow. Limitations on the number, size, and spacing of cooling passages results in gaps in the protective film and/or areas of low film cooling effectiveness which may produce localized hot spots. Airfoil hot spots are one factor which limits the operating temperature of the engine.

U.S. Pat. No. 3,527,543 to Howald uses divergently tapered passages of circular cross section to increase the entrainment of coolant in the boundary layer from a given passage. The passages are also preferably oriented in a plane extending in the longitudinal direction or partially toward the gas flow direction to spread the coolant longitudinally upon its exit from the passage as it moves downstream. Despite these features, it has been determined by smoke flow visualization tests and engine hardware inspection that the longitudinal width of the coolant film from an eliptical passage breakout (i.e. Howald) continues to expand longitudinally only about a maximum of one passage exit minor diameter after the coolant is ejected on the airfoil surface. This fact, coupled with typical longitudinal spacing of three to six diameters between passages, result in areas of airfoil surface between and downstream of longitudinally spaced passages which receive no cooling fluid from that row of passages. Conical, angled passages as described in Howald U.S. Pat. No. 3,527,543 provide at best probably no more than 70% coverage (percentage of the distance between the centers of adjacent hole breakouts which is covered by coolant).

The velocity of the air leaving the cooling passage is dependent on the ratio of its pressure at the passage inlet to the pressure of the gas stream at the passage outlet. In general the higher the pressure ratio, the higher the exit velocity. Too high an exit velocity results in the cooling air penetrating into the gas stream and being carried away without providing effective film cooling. Too low a pressure ratio will result in gas stream ingestion into the cooling passage causing a complete loss of local airfoil cooling. Total loss of airfoil cooling usually has disastrous results, and because of this a margin of safety is usually maintained. This extra pressure for the safety margin drives the design toward the high pressure ratios. Tolerance of high pressure ratios is a desirable feature of film cooling designs. Diffusion of the cooling air flow by tapering the passage, as in the Howald patent discussed above is beneficial in providing this tolerance, but the narrow diffusion angles taught therein (12° maximum included angle) require long passages and, therefore, thick airfoil walls to obtain the reductions in exit velocities often deemed most desirable to reduce the sensitivity of the film cooling design to pressure ratio. The same limitation exists with respect to the trapezoidally shaped diffusion passages described in Sidenstick, U.S. Pat. No. 4,197,443. The maximum included diffusion angles taught therein in two mutually perpendicular planes are 7° and 14°, respectively, in order to assure that separation of the cooling fluid from the tapered walls does not occur and the cooling fluid entirely fills the passage as it exits into the hot gas stream. With such limits on the diffusing angles, only thicker airfoil walls and angling of the passages in the airfoil spanwise direction can produce wider passage outlets and smaller gaps between passages in the longitudinal direction. Wide diffusion angles would be preferred instead, but cannot be achieved using prior art teachings. This is particularly true with respect to the Sidenstick patent which describes a sheet metal electrode for electro-discharge machining divergently tapered film cooling holes have trapezoidally shaped cross sections. Such a prior art electrode is shown herein in FIGS. 1, 2, and 2a, which are reproductions of FIGS. 4, 6, and 6a, respectively, of Sidenstick. Although FIG. 2a purports to show, in a "gun barrel" view, the shape of the passage formed by the sheet metal electrode of FIGS. 1 and 2, we have machined passages in curved surfaces, like airfoil surfaces, using electrodes having such shape, but found them to produce passages like that shown in FIG. 2b rather than FIG. 2a. This passage has a notch 5 along the length of the upstream surface 7; and because of this notch the coolant does not diffuse and completely fill the diffusing section. Instead it remains as a cohesive jet. This reduces the film spreading and produces a coolant film narrower than the passage outlet.

DISCLOSURE OF INVENTION

One object of the present invention is an improved electrode for forming shaped passages through the wall of a work piece.

Another object of the present invention is a sheet metal electrode for forming divergently tapered cooling air passages through the external wall of an airfoil.

According to the present invention, a sheet metal electrode has a straight, longitudinally extending forward end section, a flat middle section, and a rear section, the forward section having a flat first surface and an oppositely facing flat second surface, the middle section having a flat first surface integral with the rear edge of the first surface and forming an obtuse angle therewith, the middle section having side edges diverging from each other away from the forward section, including a pair of side walls, each integral with one of the side edges, each side wall having a longitudinally extending edge in the plane of the second surface and extending rearwardly therefrom, the rear section being integral with a rear edge of the middle section and extending rearwardly therefrom for attachment to an electro-discharge machine.

The electrode of the present invention differs from the Sidenstick electrode described in U.S. Pat. No. 4,197,443 in that the middle section of the present electrode, which forms the tapered surfaces of the passage, includes side walls along the length of its diverging edges. The side walls assure that the passage formed by the electrode has a flat surface extending from the external surface of the airfoil wall (and which is a part of the diffusing section of the passage) through the metering section to the internal surface of the wall.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIGS. 1, 2, and 2a are drawings of the prior art which to FIGS. 4, 6, and 6a, respectively, of U.S. Pat. No. 4,197,443.

FIG. 2b shows the actual shape of a passage formed using the electrode shown in FIGS. 1 and 2.

FIG. 9 is a sectional view taken generally along the line 9—9 of FIG. 8.

FIG. 10 is a sectional view taken generally along the line 10—10 of FIG. 8.

FIG. 11 is a view taken generally in the direction 11—11 of FIG. 7.

FIG. 12 shows a portion of a piece of sheetmetal which is cut along the lines drawn thereon to produce a blank from which the electrode of FIGS. 7-11 is formed.

FIG. 13 is a perspective view showing an alternate embodiment of the electrode of the present invention.

FIG. 14 is a cross-sectional view taken along the line 14—14 of FIG. 13.

BEST MODE FOR CARRYING OUT THE INVENTION

Figure 3:
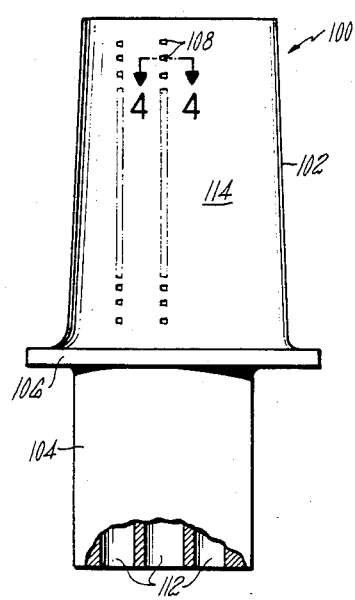
FIG. 3 is a hollow turbine blade, partly broken away, which incorporates the features of the present invention.
Figure 4:
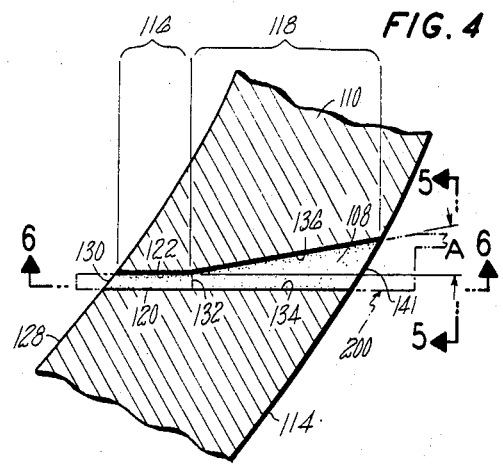
FIG. 4 is an enlarged sectional view taken along the line 4—4 of FIG. 3.

With reference to FIG. 3, a blade 100 for use in the turbine section of a gas turbine engine is shown in side elevation view. The blade 100 includes a hollow airfoil 102 which extends in a spanwise or longitudinal direction from a root 104. A platform 106 is disposed at the base of the airfoil 102. The airfoil 102 is hollow and includes a plurality of film cooling passages 108 extending through the airfoil wall 110 (FIG. 4). For purposes of simplicity and clarity, only two longitudinally extending rows of passages 108 are shown in the drawing. A typical turbine section airfoil will have many more rows of passages, some rows being on the pressure side of the airfoil, and others being disposed along the leading edge and suction side of the airfoil. In all cases the passages 108 communicate with a compartment within the airfoil, which compartment is adapted to receive pressurized coolant fluid through channels 112 through the root 104, which channels communicate with the compartments. The pressurized fluid flows out of the compartments through the wall 110 via the passages 108, cooling the wall and preferably forming a film of coolant on the outer surface 114 of the airfoil downstream (i.e., in the direction of the mainstream hot gas flow over the airfoil surface) of the passage outlet.

Figure 5:
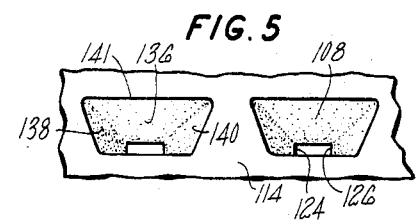
FIG. 5 is a view taken generally in the direction 5—5 of FIG. 4.
Figure 6:
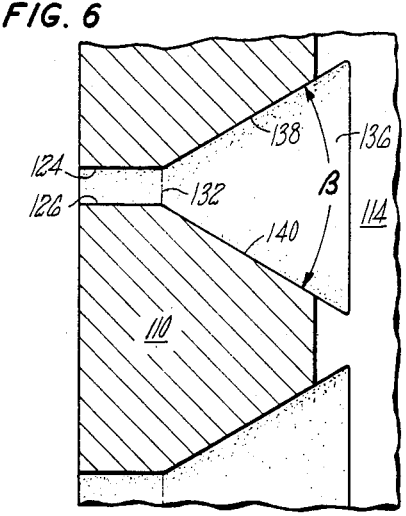
FIG. 6 is a sectional view taken along the line 6—6 of FIG. 4.
Figure 8:
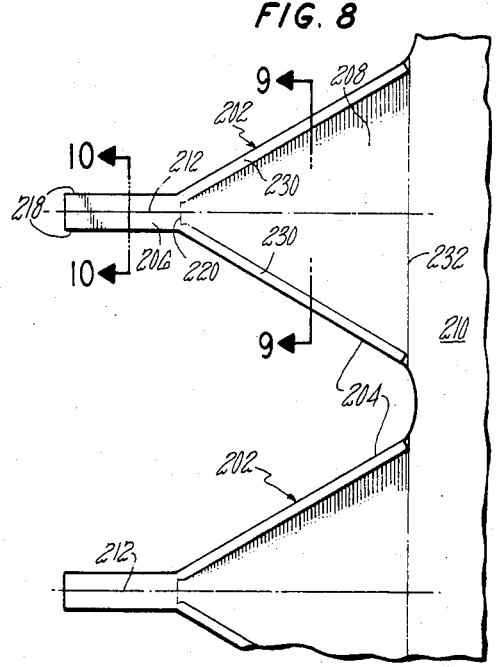
FIG. 8 is a view taken generally in the direction 8—8 of FIG. 7.
Figure 7:
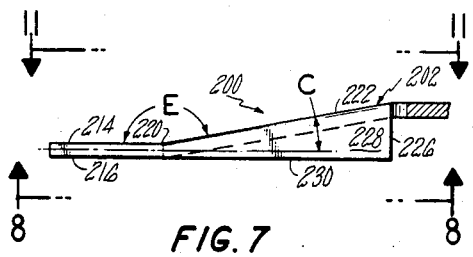
FIG. 7 is a side view of an electrode incorporating the features of the present invention.

The shape of the coolant passages is best described with respect to FIGS. 4-6. Essentially, each passage 108 includes a straight metering section of constant cross section along its length, and a diffusing section 118 in series flow relation therewith. The metering section 116 includes a pair of first and second flat, spaced apart, parallel side walls 120, 122 interconnected by a pair of flat, spaced apart, parallel end walls 124, 126. These walls intersect the internal wall surface 128 of a compartment on the inside of the airfoil and define an inlet 130 to the passage 108 and to the metering section 116 for receiving a controlled flow of coolant fluid from the airfoil compartment. The outlet 132 of the metering section is coincident with the inlet of the diffusing section. The diffusing section comprises a pair of spaced apart, facing side walls 134, 136 interconnected by a pair of facing, spaced apart, end walls 138, 140. The side walls and end walls of the diffusing section intersect the outer surface 114 of the wall 110 to define an outlet 141. The side surface 134 of the diffusing section 118 is coplanar with the side surface 120 of the metering section 116. The side surface 136 of the diffusing section 118 diverges from the opposing side surface 134 toward the outlet 140 at an angle herein designated by the letter A. The end surfaces 138, 140 diverge from each other by an included angle B.

FIGS. 7-11 show a sheet metal electrode 200 for electro-discharge machining passages having a shape like that of the passages 108. Each electrode includes a plurality of teeth 202. Each tooth 202 includes a front section 206, a middle section 208, and a rear section 210. The rear sections 210 of the teeth 202 are coextensive and form a common base (hereinafter also referred to by the reference numeral 210) for the electrode 200 which, during use, is secured to a tool holder (not shown). The holder is connected to a negative terminal of a DC power source; and the airfoil 102 into which the passages are to be machined is connected to a positive terminal. The electrode is moved toward the wall of the work piece to be machined, such as the airfoil wall 110, and when the gap between the electrode and the surface of the airfoil becomes small enough there will be an electric discharge thereacross which removes particles of material from the airfoil. The electrode continues to be moved into the airfoil until the front sections 206 of the teeth 202 pass entirely through the wall 110, but to a predetermined depth. In FIG. 4 the phantom line shows the position of the electrode 200 at its full depth. In this embodiment the base 210 of the electrode 200 does not penetrate the airfoil wall 110. Thus, the shape of the passages formed by the electrode are determined solely by the shape of the front and middle sections 206, 208 of the electrode teeth 202 and the direction of movement of the electrode into the airfoil.

In accordance with the present invention, the front section 206 is flat and elongated in what is herein referred to as the longitudinal direction, which is along an axis 212 of the tooth 202. The front section 206 has a constant cross-sectional area perpendicular to the longitudinal and includes an upper surface 214, the upper surface having a pair of straight, parallel side edges 218 extending in the longitudinal direction, and a rear edge 220 interconnecting the side edges. The middle section 208 includes a flat upper surface 222 lying in a plane which forms an obtuse interior angle E with the upper surface 214 and an acute angle C with an extension of the plane of the upper surface 214. The upper surface 222 has a forward edge coincident with and the same length as the rear edge 220 of the upper surface 214. The upper surface 222 also has a pair of side edges 224 on opposite sides of the axis 212, each edge diverging therefrom by an angle herein designated by the letter D (FIG. 11). Each edge 224 also includes a side wall 226 integral therewith along the length of the edge, the side walls, in this preferred embodiment, being perpendicular to the plane of both upper surfaces 214, 222. Each side wall includes an outer surface 228 facing away from the axis 212, and a straight lower edge 230 extending rearwardly from the rear edge 220 of the front section to the base 210. The edges 230 lie in the plane of the lower surface 216 of the front section. The base 210 has a front edge 232 which is contiguous with a rear edge of each of the middle sections 208. In this embodiment the base 210 is parallel to the front section 206.

From the drawing it can be seen that the outwardly facing surfaces 228 of the side walls 226 of each electrode tooth form the end surfaces 138, 140 of the diffusing section 118 of the coolant passage 108. In this regard, the angle D (FIG. 11) is one-half the desired included angle B of the coolant passage. Similarly, the upper surface 222 of the middle section 208 forms the side surface 136, of the diffusing section 118; and the lower edges 230 of the side walls 226, along with the lower surface 216 of the front section 206, form the side surface 134 of the diffusing section 118. Thus, the angle C of each electrode tooth is selected to be substantially the angle A of the coolant passage.

FIG. 12 shows a top view of a portion of a piece of sheet metal from which the electrode of FIGS. 7-11 may be cut. The solid lines and that portion of the piece of sheet metal which is unshaded is the shape of the flat sheet metal (i.e., blank) which may be cut from the larger piece and formed to the electrode of the present invention. The shaded areas of the piece of sheet metal are discarded. The dashed lines are the lines along which the sheet metal is bent to form the electrode shown in FIGS. 7-11. Actually, the sheet metal is formed to its finished shape by stamping the blank in a die having the desired finished shape.

FIGS. 13 and 14 show an alternate configuration for the electrode of the present invention wherein the side walls 300 blend as a smooth curve with the flat upper surface 302 of the middle section. Such an electrode produces a coolant passage having smoothly curved corners which increase in radii to the passage outlet. Preferably the curved corners are the shape of oblique cones. Passages of this shape are more fully described in commonly owned U.S. patent application Ser. No. 812104 titled "Improved Film Cooling Passages with Curved Corners" by Robert E. Field filed on even date herewith and incorporated herein by reference.

Although the invention has been shown and described with respect to a preferred embodiment thereof, it should be understood by those skilled in the art that other various changes and omissions in the form and detail of the invention may be made without departing from the spirit and scope thereof.

I claim:
1. An electrode adapted for installation in an electric discharge machine, said electrode including at least one longitudinally extending tooth having a longitudinally extending axis, said tooth being formed of a single piece of sheet metal and comprising, in series, a front section, a middle section and a rear section, said front section having parallel lower and upper surfaces, said upper surface lying in a first plane and having a pair of straight, parallel side edges extending in the longitudinal direction and a rear edge interconnecting said side edges;

said middle section having an upper surface lying in a second plane which forms an interior obtuse angle with said first plane and an acute angle with an extension of said first plane, said upper surface of said middle section having a forward edge, said forward edge being coincident with and the same length as said rear edge of said front section and having side edges in the plane of said upper surface extending rearwardly from said forward edge on opposite sides of said longitudinally extending axis, at least one of said middle section side edges diverging from said axis;

each of said side edges of said middle section having a side wall integral therewith along the length of said middle section side edge, each side wall having a surface facing outwardly away from said axis, each side wall having a straight lower edge lying in the plane of said lower surface of said front section and extending from said front section, rearwardly; and said rear section extending rearwardly from said middle section and adapted to be connected to a power source.

2. The electrode according to claim 1 wherein both of said upper edges diverge from said axis.

3. The electrode according to claim 1 wherein said rear section is substantially parallel to the upper surface of said first section.

4. The electrode according to claim 1 wherein said side walls are perpendicular to said upper surface of said middle section.

5. The electrode according to claim 1 wherein each of said side walls blends with said upper surface of said middle section as a smooth curve.

6. The electrode according to claim 5 wherein said smooth curve forms the shape of a cone.

* * * * *